Aug. 6, 1940.   J. B. DEVENISH   2,210,362
SETTLING SEPARATORS
Filed Oct. 25, 1938   2 Sheets-Sheet 1
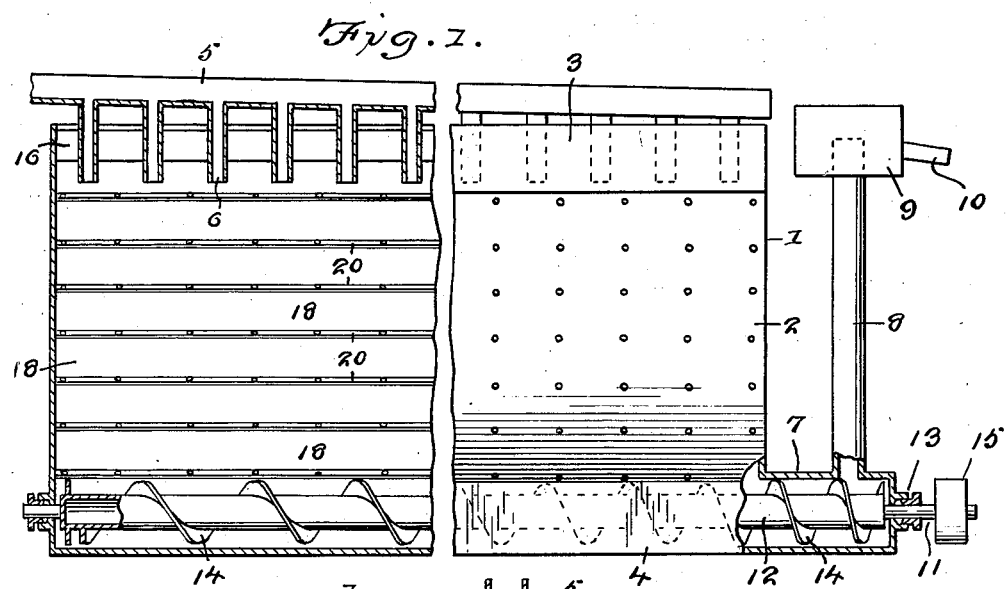
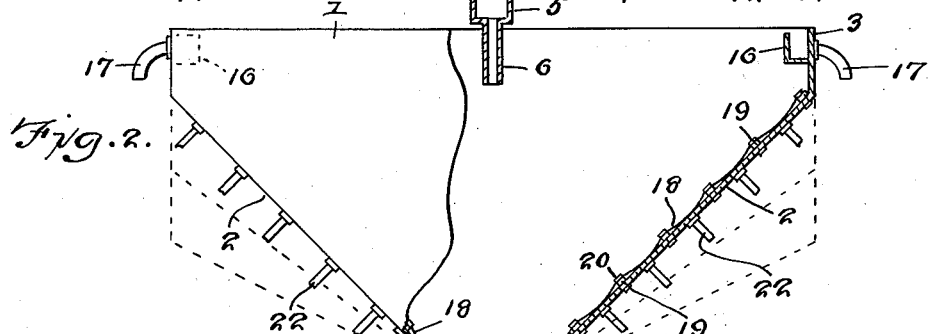
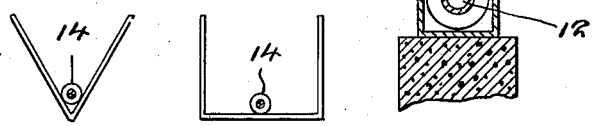
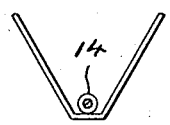
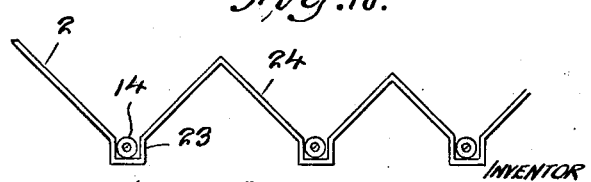

Aug. 6, 1940.   J. B. DEVENISH   2,210,362
SETTLING SEPARATORS
Filed Oct. 25, 1938   2 Sheets—Sheet 2
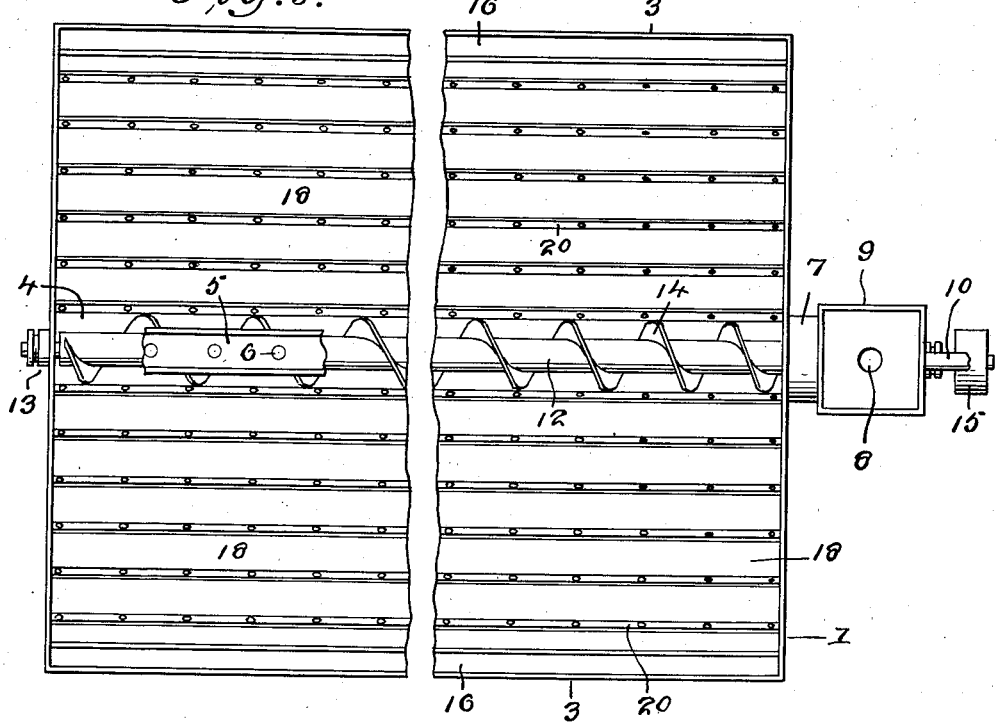
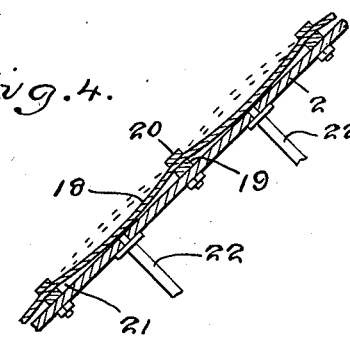
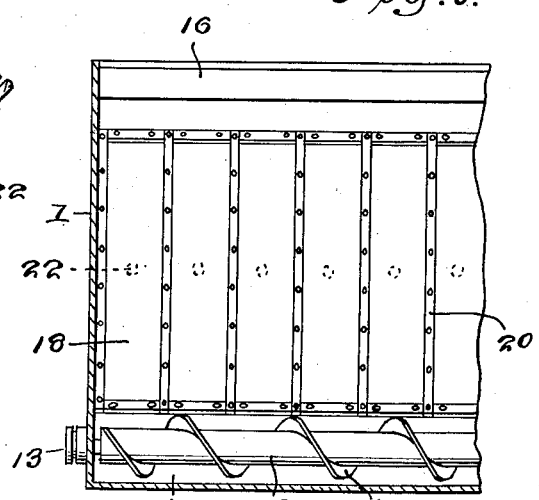
INVENTOR
JACK B. DEVENISH, DECEASED
BY STEPHEN C. DEVENISH, ADMINISTRATOR
BY *Victor J. Evans & Co.*
ATTORNEYS

Patented Aug. 6, 1940

2,210,362

UNITED STATES PATENT OFFICE 2,210,362

SETTLING SEPARATORS

Jack B. Devenish, deceased, late of Baguio, P. I., by Stephen C. Devenish, administrator, Spokane, Wash.

Application October 25, 1938, Serial No. 236,946

2 Claims. (Cl. 210—55)

This invention relates to separators, and its general object is to provide an apparatus of that character for treating fluids or solutions of all kinds and for all purposes, in large volumes by the settling process, to separate the precipitates or solid matter thereof from the liquid, in a thorough and rapid manner, as well as to discharge the resulting pulp from the apparatus by force feeding the same to the outlet or discharge end thereof, and overflowing the liquid therefrom.

A further object is to provide a separator in the form of a settling or thickening apparatus that includes a tank or container having inwardly inclined or downwardly converging side walls of any required angle for directing the solid matter by gravity toward a conveyor trough longitudinally of and at the bottom of the tank and through and from which the pulp is forcibly fed and conveyed to and through discharge means, by a screw conveyor.

Another object is to provide an apparatus of the character set forth, in which the incoming fluid to be treated is uniformly distributed throughout the length of the tank, so that the contents of the latter is not materially agitated, with the result the settling action is not retarded and separation is continuous.

A still further object is to provide a separator including means which not only conveys and discharges the pulp from the tank, but elevates the same, thereby eliminating additional apparatus or machinery for that purpose.

A further object is to provide a separator that includes a variable pitch blade conveyor which gradually increases in pitch toward the discharge end of the trough, so as to the eliminate accumulation of the pulp and thereby prevent clogging.

Another object is to provide a separator that includes a tank having converging walls as set forth, with moving or pulsating means associated therewith, so as to materially increase the travel of the settled matter down the same to the conveyor trough.

A still further object is to provide an apparatus of this character that can be easily and expeditiously installed, requires no heavy or bulky superstructure, is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a partial side and longitudinal sectional view of the apparatus which forms the subject matter of the present invention with parts broken away.

Figure 2 is a partial end and vertical sectional view and illustrates the various degrees of inclination of the converging side walls of the tank, in full and dotted lines.

Figure 3 is a top plan view, with parts broken away.

Figure 4 is a detail sectional view taken through a fragmentary portion of one of the converging walls of the tank, and illustrates the action of the pulsating means therefor in full and dotted lines.

Figure 5 is a fragmentary view illustrating the preferred arrangement of the pulsating means, with the fastening means or straps thereof extending from top to bottom of the converging wall of the tank instead of longitudinally thereof, as shown in Figures 1, 2 and 3.

Figures 6 to 10 inclusive are detail views illustrating various types of conveyor troughs.

Referring to the drawings in detail, it will be noted that the tank or container of the apparatus is of cross sectional substantially triangular configuration, and may be of any length suitable for the purpose. It includes straight vertical end walls 1 and side walls 2 which include major downwardly converging portions and upper vertical parallel portions 3, while the lower ends of the converging portions merge into a trough 4 that extends for the entire length of the tank, as best shown in Figure 3.

Suitably supported above the tank at a slight inclination, as shown in Figure 1, for disposal in a plane above the longitudinal center thereof is an inlet or feed launder 5 which is shown as being of rectangular configuration, but may be of any shape suitable for the purpose, and the lower end is closed, while the opposite end or portion receives the fluid or solution to be treated. The launder has formed thereon and depending therefrom preferably at equi-distantly spaced relation along the length thereof that overlies the tank, a plurality of tubes 6 that extend into the tank, for depositing the fluid therein, as will be apparent.

The trough 4 is of course to receive the pulp or solid matter, and not only extends for the entire length of the tank, but also through one end wall thereof, for communication with a discharge chamber 7 which may have an outlet at its outer end, but is shown as being closed, with a pipe 8 rising therefrom, for the passage of the pulp therethrough and which is forced accordingly by the screw conveyor which will be presently described. The pipe 8 is shown as having an open top overflow receptacle mounted on its upper end to receive the pulp, and a spout 10 in the form of a pipe or the like extends from the receptacle at a downward inclination for the passage of the pulp therethrough.

Journaled in suitable bearings in the forward end wall and the outer wall of the chamber 7 are the trunnions 11 of a hollow or tubular shaft 12 of a screw conveyor which is mounted in and extends longitudinally of the trough 4 and the chamber 7, as best shown in Figure 1. The trunnions or stub shafts 11 of the tubular shaft are provided with suitable packing glands 13 and the pitch of the blade 14 of the conveyor gradually decreases toward the discharge end of the apparatus, so as to prevent accumulation of the pulp within the chamber and clogging of the apparatus, as will be apparent. The shaft 12 may of course be solid but I preferably provide a hollow shaft with closed ends, so that it includes buoyant qualities and therefore will tend to float on the pulp between the bearings thereof, with the result the bearings can be placed a considerable distance apart, as will be apparent, yet the conveyor will be properly supported for rotation. The conveyor may be rotated by any suitable means, and I have illustrated a pulley 15 mounted on one of the stub shafts or trunnions 11 thereof.

Mounted on the inner sides of the vertical portions 3 of the side walls 2 are overflow launders 16 which are shown as being of rectangular configuration and extend for the entire length of the side walls. The inner portions of the launders 16 terminate below the upper open end of the tank, as shown in Figure 2, and secured to the vertical portions 3 for communication with the overflow launders 16 are downwardly curved discharge spouts 17 preferably disposed midway the ends thereof.

It will be obvious from the foregoing description and disclosure in the drawings, that the fluid or solution is conveyed and deposited into the tank, by the inlet or feed launder 5 and the tubes 6 thereof, and as the precipitates or solid matter settle, it will be directed toward and into the trough 4, from which it is conveyed to the discharge chamber 7 by the screw conveyor and thence forced upwardly through the pipe 8 into the receptacle 9 from which it is discharged by the spout 10. The liquid overflows into the launders 16 and is passed therefrom by the discharge spouts 17.

In order to increase the movement of the travel of the settled matter down the converging walls or to remove such matter or pulp that has adhesive qualities, pulsating means are employed on the inner surfaces of the walls of the tank, and particularly the converging portions of the side walls, as shown in the drawings. This pulsating means is made up of impervious sheets of material 18, such as rubber or rubberized cloth, that are fastened in an airtight manner to the converging portions to provide air chambers that extend either longitudinally of the converging portions as shown in Figures 1 to 3 inclusive or from top to bottom thereof, as shown in Figure 5.

The latter arrangement is preferred but in any event the converging portions have inner and outer fastening strips 19 and 20 respectively secured thereto with the sheets of material fixed between the same, to provide the chambers 21, each of which is in communication with a suitable source of air supply, through the medium of pipe lines 22 that provide inlet and outlet means for the chambers for the passage of air in and from the same to bring about a pulsating action of the sheet material.

In Figures 6 to 10 inclusive, there are illustrated various types of conveyor troughs that may be employed with my apparatus, and the form of Figure 6 is of the single triangular type, Figure 7 the rectangular type, and Figure 8 illustrates converging walls extending into a straight horizontal bottom wall. The form of Figure 9 may be termed the multiple triangular type, while the form of Figure 10 is also the multiple type, but includes rectangular troughs 23 connected by downwardly diverging cross sectional triangular members 24.

The apparatus may be supported by any suitable means for that purpose, and in Figure 2 is illustrated a concrete base to be included in the supporting means and upon which the trough 4 rests.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. A settling separator comprising an open top tank, downwardly converging wall portions included in said tank, a feed launder supported above the tank, feed tubes depending from the launder into said tank throughout the entire length of the latter for introducing fluid therein and being disposed in equi-distantly spaced relation with respect to each other, trough means in the bottom of said tank, pulp outlet means for said tank and including a chamber communicating with the trough means, a pipe rising from the chamber, an overflow receptacle on the upper end of the pipe, outlet means for the receptacle, a screw conveyor in the trough means and including a blade decreasing in pitch toward the outlet means, and said conveyor extending into the chamber for conveying the pulp through the trough means and the chamber to force the same through the pipe and receptacle.

2. A settling separator comprising a tank, downwardly converging wall portions included in said tank, means for introducing fluid in said tank, pulp outlet means for said tank, means in the bottom of said tank for conveying the pulp to and through the outlet means, liquid overflow means for said tank, superimposed strips secured to the inner surfaces of said wall portions, impervious flexible sheet material fixed between the confronting faces of the strips and covering the entire area of said inner surfaces to cooperate therewith and the inner strips to provide airtight chambers, and inlet and outlet pipe lines communicating with the chambers for the passage of air in and from the same to bring about a pulsating action of the sheet material.

STEPHEN C. DEVENISH,
*Administrator of the Estate of Jack B. Devenish.*